United States Patent
Spieth

(10) Patent No.: US 11,466,665 B2
(45) Date of Patent: Oct. 11, 2022

(54) METHOD FOR INSTALLING A WIND TURBINE ROTOR BLADE

(71) Applicant: Wobben Properties GmbH, Aurich (DE)

(72) Inventor: Falk Spieth, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/287,065

(22) PCT Filed: Oct. 22, 2019

(86) PCT No.: PCT/EP2019/078688
§ 371 (c)(1),
(2) Date: Apr. 20, 2021

(87) PCT Pub. No.: WO2020/083890
PCT Pub. Date: Apr. 30, 2020

(65) Prior Publication Data
US 2021/0355914 A1    Nov. 18, 2021

(30) Foreign Application Priority Data
Oct. 26, 2018    (DE) .................... 10 2018 126 728.2

(51) Int. Cl.
*F03D 13/10* (2016.01)

(52) U.S. Cl.
CPC .......... *F03D 13/10* (2016.05); *F05B 2230/61* (2013.01)

(58) Field of Classification Search
CPC .... B66C 1/16; B66C 1/18; B66C 1/10; B66C 1/0262; F03D 13/10; F03D 1/0658; F05B 2230/61
See application file for complete search history.

(56) References Cited

U.S. PATENT DOCUMENTS

| 2,873,226 | A | * | 2/1959 | Davies et al. | ....... H01M 50/116 |
|---|---|---|---|---|---|
| | | | | | 428/196 |
| 4,569,301 | A | * | 2/1986 | Pyburn | ..................... B63B 1/12 |
| | | | | | 114/343 |
| 5,772,269 | A | * | 6/1998 | Henning, Jr. | ............. B66C 1/16 |
| | | | | | 294/67.22 |
| 2010/0139062 | A1 | * | 6/2010 | Reed | ...................... F03D 13/10 |
| | | | | | 29/889.1 |

(Continued)

FOREIGN PATENT DOCUMENTS

| CN | 103174601 B | 5/2015 |
|---|---|---|
| CN | 105649893 A | 6/2016 |

(Continued)

OTHER PUBLICATIONS

Cao Chenrui, CN-107059448-A, Machine Translation (Year: 2017).*

*Primary Examiner* — Lee A Holly
(74) *Attorney, Agent, or Firm* — Seed Intellectual Property Law Group LLP

(57) ABSTRACT

There is provided a method of installing a wind turbine rotor blade. A holding unit is releasably fixed at the exterior to the rotor blade without intervention in the surface of the rotor blade. A holding cable is fixed to the holding unit. The rotor blade is installed on the hub of the wind turbine, for which purpose the rotor blade is pulled up for example by means of a crane. The holding unit is released by changing the pitch of the rotor blade.

12 Claims, 2 Drawing Sheets

(56) References Cited

U.S. PATENT DOCUMENTS

2015/0300175 A1 10/2015 Pfeiffer et al.

FOREIGN PATENT DOCUMENTS

| CN | 107059448 A | * | 8/2017 | ............ D07B 1/162 |
|---|---|---|---|---|
| DE | 10 2011 116 189 B3 | | 10/2012 | |
| DE | 10 2014 002 228 A1 | | 8/2015 | |
| EP | 1925583 A1 | | 5/2008 | |
| EP | 3351790 A1 | | 7/2018 | |

* cited by examiner

METHOD FOR INSTALLING A WIND TURBINE ROTOR BLADE

BACKGROUND

Technical Field

The present invention concerns a method of installing a wind turbine rotor blade and a holding unit for installing a wind turbine rotor blade.

Description of the Related Art

In the erection of a wind turbine, the rotor blades are fixed either individually or jointly to the aerodynamic rotor by means of a crane on a nacelle of the wind turbine. Upon installation of individual rotor blades, the rotor blade is lifted by means of a crane. A holding cable is fixed to the rotor blade to secure the rotor blade during the installation procedure. The holding cable has to be removed after termination of the operation of installing the rotor blade to a nacelle of the wind turbine. For that purpose then one or two installation technicians are pulled up to the rotor blade, for example by means of a workman basket, on the main crane hook, to remove the holding cable.

Remotely releasable holding cables are known as an alternative thereto. They however require intervention in the design of the rotor blade whereby the rotor blade becomes more complicated and costly.

On the German patent application from which priority is claimed the German Patent and Trade Mark Office searched the following documents: DE 10 2011 116 189 B3, DE 10 2014 002 228 A1, U.S. Pat. No. 5,772,269 A, EP 1 925 583 A1 and CN 105 649 893 A.

BRIEF SUMMARY

Provided herein are techniques to simplify installation of a wind turbine rotor blade. In particular, provided herein is a method to simplify removal of a holding cable.

Provided is a method of installing a wind turbine rotor blade and a holding unit for the installation of a rotor blade.

Accordingly there is provided a method of installing a wind turbine rotor blade. A holding unit is releasably fixed at the exterior to the rotor blade without intervention into the surface of the rotor blade. A holding cable is fixed to the holding unit. The rotor blade is installed on the hub of the wind turbine, for which purpose the rotor blade is pulled up for example by means of a crane. The holding unit is released by changing the pitch of the rotor blade.

In that way it is possible to remove the holding cable from the installed rotor blade without a technician having to be pulled up or without remotely releasable removal of the holding cable being required. The holding unit to which the holding cable is fixed is released merely by turning or changing the pitch angle of the rotor blade about the longitudinal axis thereof.

According to an aspect of the present invention the holding unit has at least one strap which is wound at least once around the wind turbine rotor blade to be fixed at the exterior to the wind turbine rotor blade. The holding cable can then be fixed to the strap. When installation of the rotor blade has been effected, the rotor blade only has to be rotated so that the strap which is wound around the rotor blade can come loose or be removed.

Provided is a holding unit for installing a rotor blade. The holding unit has a strap like for example a flat belt strap and a clamping unit for example in the form of a clamping bar. The clamping bar is suitable for being fixed to a trailing edge of the rotor blade. For installation of the rotor blade, the strap is wound at least once around the rotor blade and an end is fixed to a trailing edge of the rotor blade by means of the clamping bar.

According to a further aspect of the present invention, the holding unit has a support overlay as protection for the surface of the rotor blade between the surface of the rotor blade and the strap.

According to a further aspect of the present invention, the clamping unit can be in the form of a glass fiber-reinforced plastic GPR hook or bar.

According to a further aspect of the present invention, the strap has an anti-slip surface.

According to a further aspect of the present invention, an end of the strap is clamped or fixed to the clamping unit and a second end of the strap is fixed to the holding cable.

According to a further aspect of the present invention, the clamping unit is fixed to a crane or the holding cable by way of a securing cable.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
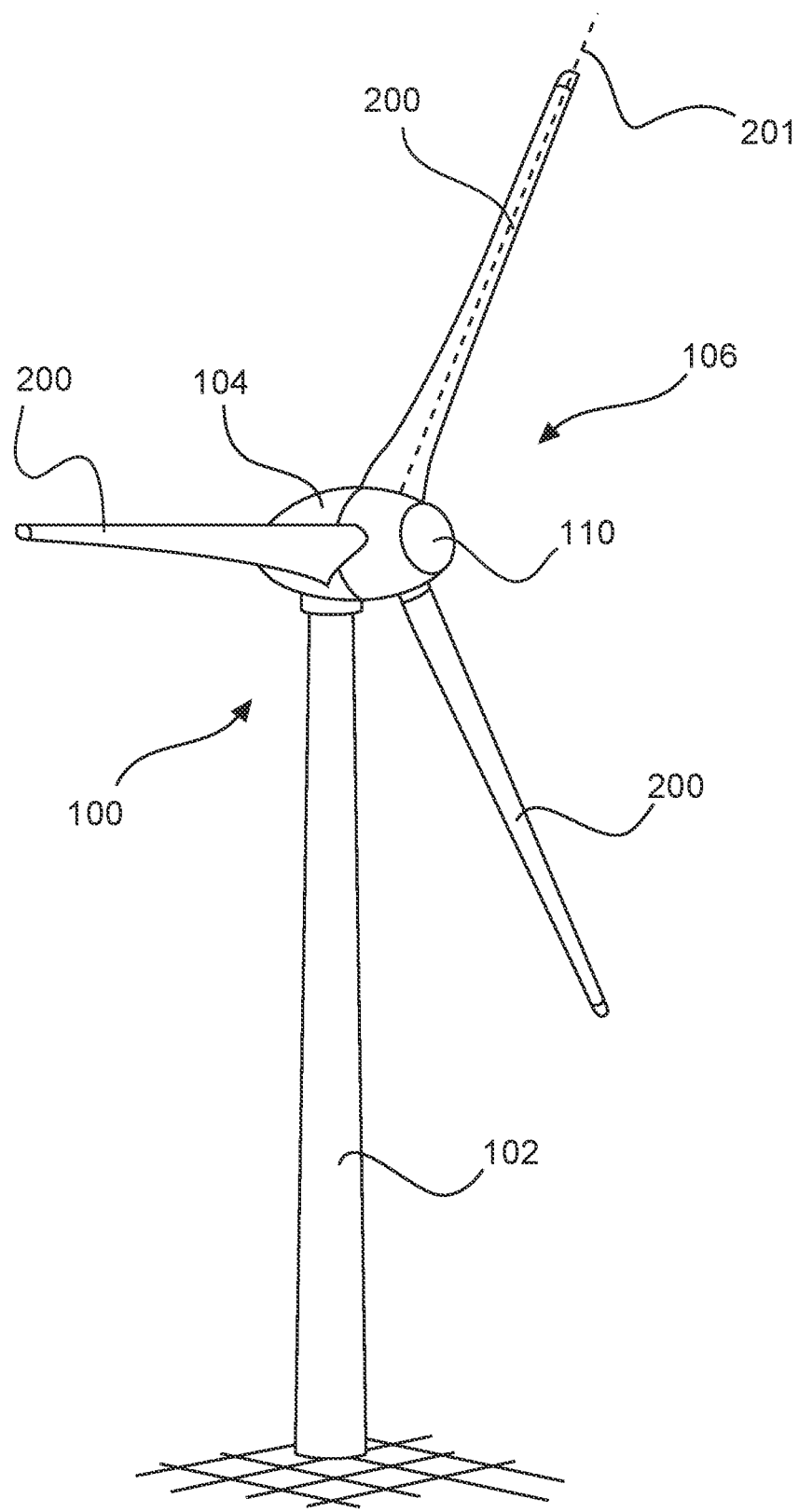
FIG. 1 shows a diagrammatic view of a wind turbine according to the invention.

FIG. 1 shows a diagrammatic view of a wind turbine according to the invention. FIG. 1 shows a wind turbine 100 comprising a tower 102 and a nacelle 104. A rotor 106 having three rotor blades 200 and a spinner 110 is arranged on the nacelle 104. In operation the rotor 106 is caused to rotate by the wind and thereby drives a generator in the nacelle 104. The rotor blades 200 can be rotated along their longitudinal axis 201, that is to say the pitch (angle) can be altered.

Figure 2:
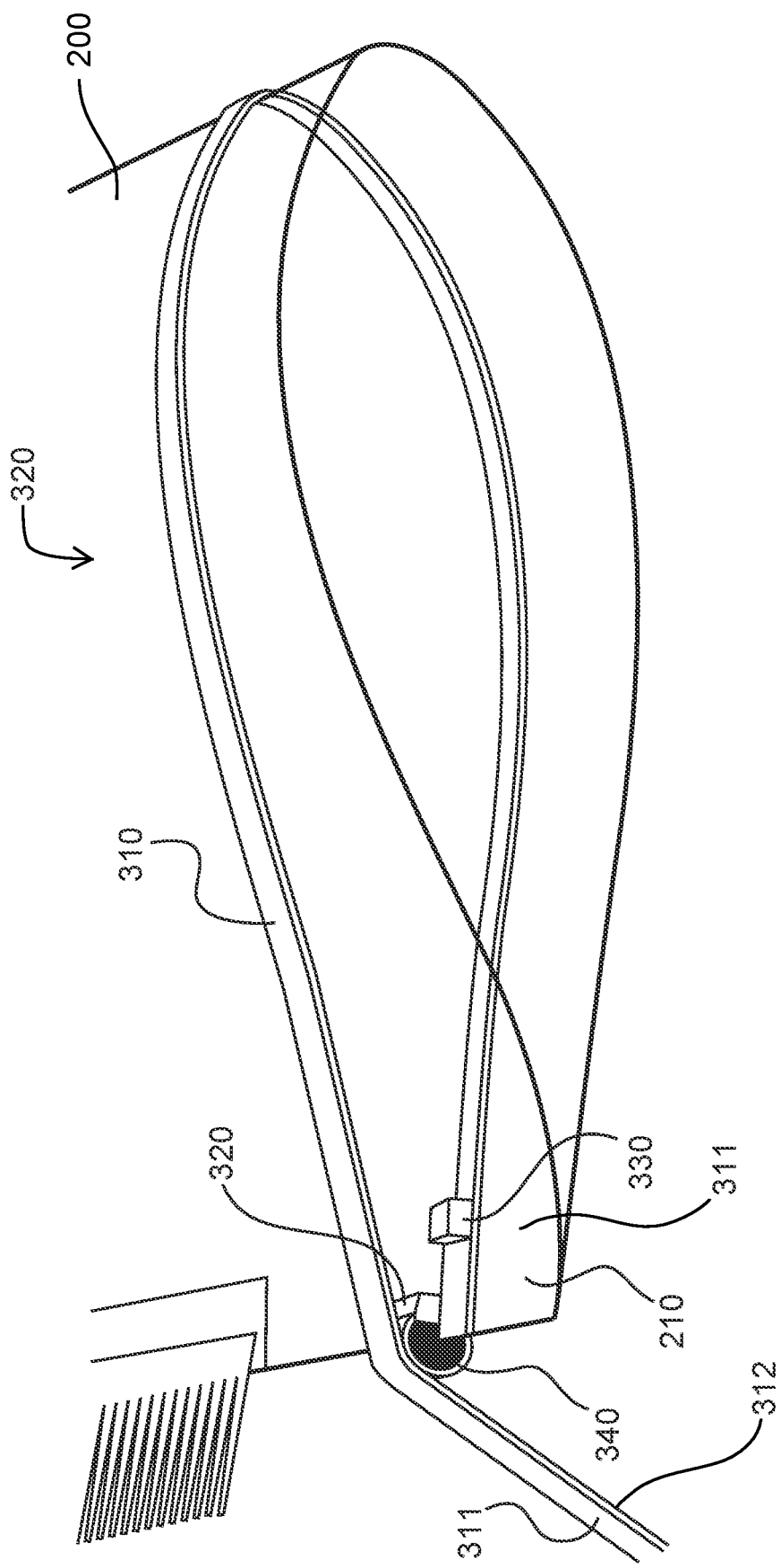
FIG. 2 shows a diagrammatic view of an end of a rotor blade according to an embodiment of the invention.

FIG. 2 shows a diagrammatic view of an end of a rotor blade according to an embodiment of the invention. FIG. 2 shows in particular a rotor blade 200 having a rotor blade trailing edge 210 and a holding unit 300. The holding unit 300 has a strap 310 (for example a flat strap), a clamping bar 320 which is fixed to the rotor blade trailing edge 210, optionally a support rest 330 and an end edge protection 340. The strap 310 has a first end 311 which can be clamped by means of the clamping bar 320. A second end 312 of the strap 310 can be coupled to a holding cable.

The clamping bar 320 can be in the form of a clamping unit and can be for example in the form of GRP (glass reinforced plastic) hooks. Optionally the end edge protection can be integrated. The strap 310 is thus passed over the trailing edge, along the pressure side, in the direction of the leading edge of the rotor blade and along the suction side back to the trailing edge again. This means that the strap is wound at least once around the rotor blade. As an alternative thereto the strap 310 can also be wound around the rotor blade a plurality of times.

According to an aspect of the present invention the strap can have an anti-slip surface on its inside.

Due to the gravitational force on the holding cable and also due to the holding forces which are exerted on the holding cable (when using an electric winch, at least 200 N) the clamping unit can be permanently pressed against the trailing edge so that the holding cable is fixed to the rotor blade in positively locking relationship.

After conclusion of the installation of the rotor blade, the holding unit 300 with the clamping unit 310 can be released by rotating or changing the pitch of the rotor blade.

Optionally the clamping unit can be connected to the crane hook by way of a securing cable to ensure that the clamping unit cannot drop down unimpededly.

Optionally it is possible to provide an external or modular control unit to permit pitch control of the rotor blades if the wind turbine is not yet connected to the power supply grid.

The holding unit is advantageous because the strap (in particular a flat strap) ensures distribution of the forces involved over the surface of the rotor blade by being wrapped around it. The clamping bar is also less loaded by virtue of the friction of the strap against the surface of the rotor blade.

The invention claimed is:

1. A method of installing a wind turbine rotor blade, the method comprising:
   releasably fixing a holding unit at an exterior of the wind turbine rotor blade;
   fixing a holding cable to the holding unit;
   installing the wind turbine rotor blade to a hub of the wind turbine; and
   releasing the holding unit from the wind turbine rotor blade by turning the wind turbine rotor blade about a rotor blade longitudinal axis.

2. The method according to claim 1 wherein:
   the holding unit has at least one strap wound at least once around the exterior of the wind turbine rotor blade to releasably fix the holding unit at the exterior to the wind turbine rotor blade,
   wherein the holding unit comprises a clamping unit configured to fix an end of the strap to a trailing edge of the wind turbine rotor blade,
   wherein the holding unit comprises an end edge protection, and
   wherein the clamping unit is in the form of a hook.

3. The method according to claim 2 wherein the strap has at least portion-wise an anti-slip surface.

4. The method according to claim 2 wherein the strap has a first end clamped with the clamping unit and a second end, wherein the second end is fixed to the holding cable.

5. The method to claim 2 wherein the hook is made from glass reinforced plastic.

6. The method according to claim 1, wherein the holding unit comprises:
   at least one strap configured to be wound around the exterior of the wind turbine rotor blade;
   a clamping unit adapted to fix an end of the at least one strap to a trailing edge of the wind turbine rotor blade; and
   an end edge protection,
   wherein the clamping unit is in the form of a hook.

7. The method according to claim 6 wherein at least a portion of an inner surface of the strap has an anti-slip surface.

8. The method according to claim 6 wherein the strap has a first end configured to be clamped with the clamping unit and a second end configured to be fixed to a holding cable.

9. The method according to claim 6 wherein the clamping unit is secured to a securing cable configured to prevent the clamping unit from falling.

10. The method according to according to claim 6 wherein the hook is made from glass reinforced plastic.

11. The method according to claim 1 wherein the holding unit comprises a support overlay as protection for a surface of the rotor blade.

12. The method of installing a wind turbine rotor blade according to claim 1 wherein the holding unit is releasably fixed to the exterior to the wind turbine rotor blade by being wrapped one or more time around an exterior surface of the wind turbine rotor blade.

* * * * *